May 4, 1954 A. V. JIROUCH 2,677,409
FILM SPLICING APPARATUS
Filed Aug. 5, 1950 2 Sheets-Sheet 1
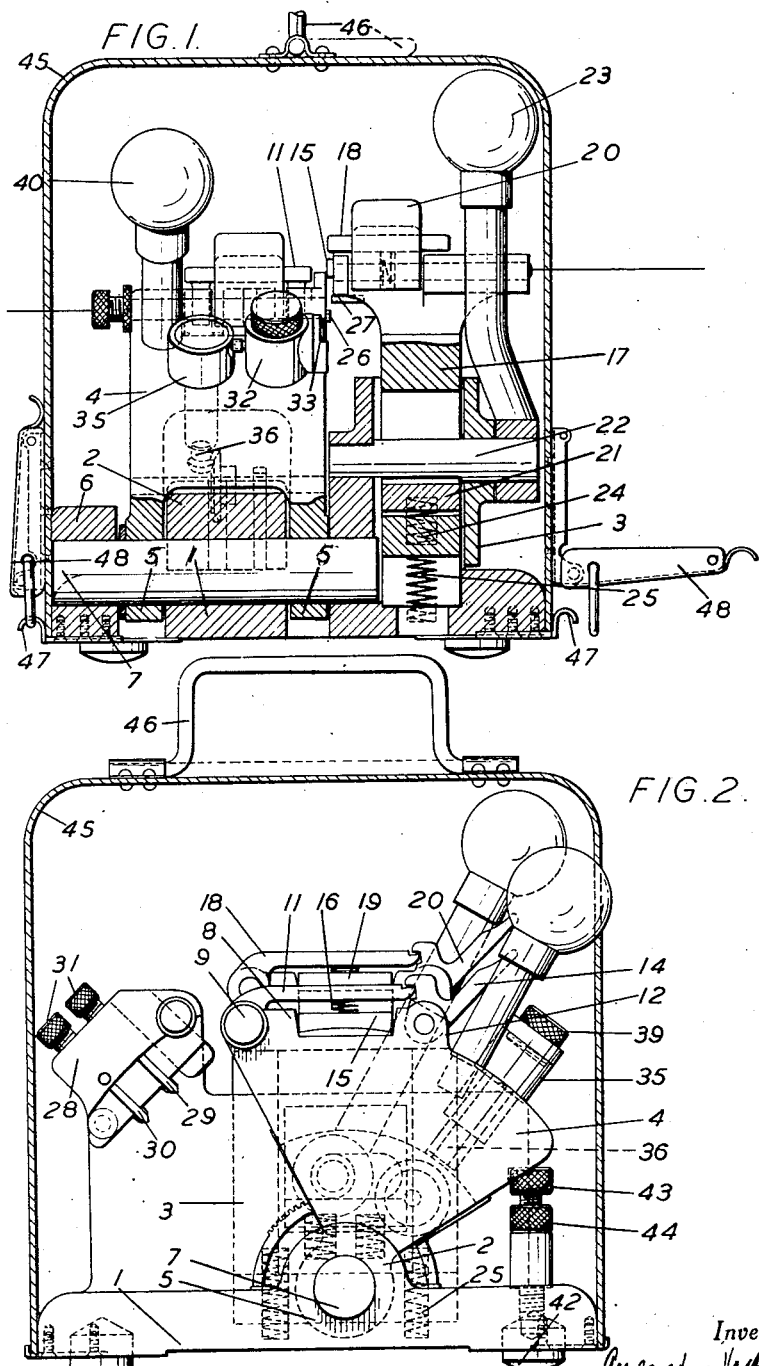

May 4, 1954 A. V. JIROUCH 2,677,409
FILM SPLICING APPARATUS
Filed Aug. 5, 1950 2 Sheets-Sheet 2
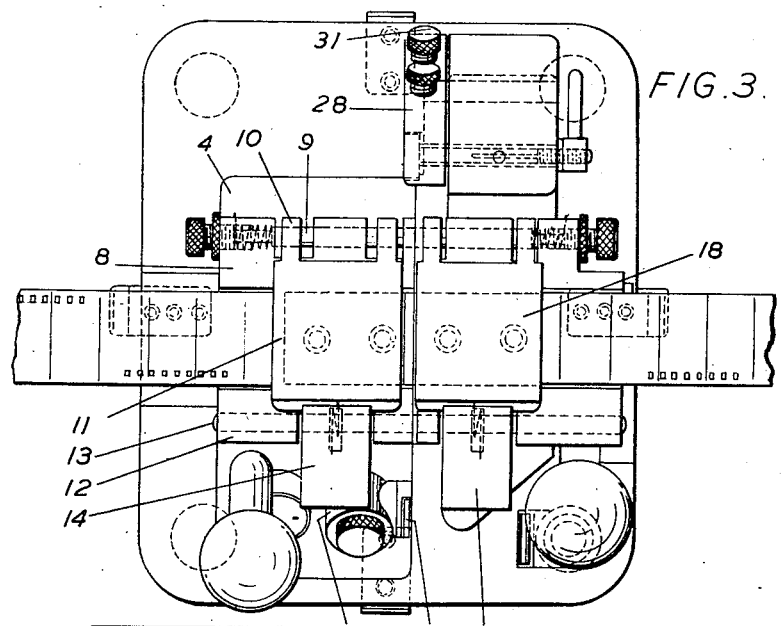
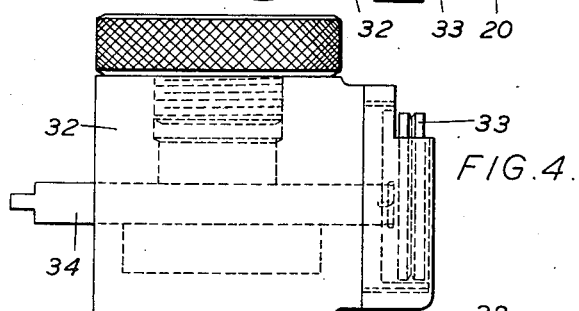
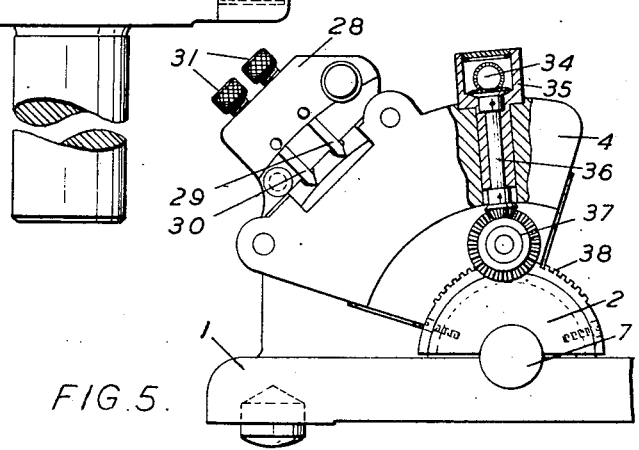

Patented May 4, 1954

2,677,409

UNITED STATES PATENT OFFICE 2,677,409

FILM SPLICING APPARATUS

Augustin Vojtech Jirouch, London, England

Application August 5, 1950, Serial No. 177,895

Claims priority, application Great Britain
August 11, 1949

11 Claims. (Cl. 154—42.1)

This invention relates to film splicing apparatus, and aims at the provision of apparatus of simple character which will easily, rapidly and accurately splice together the ends of broken portions of a cinematographic film or like material.

The invention consists in a film splicing machine comprising separately movable supports for receiving the two ends of film being spliced together, and means carried by one of the said supports adapted, when that support is moved, to make contact with, and apply adhesive to, a surface of the film carried by the other support.

In one form of the invention the film splicing apparatus comprises separate clamping means for receiving the ends of the two portions of film being joined together, which clamping means are relatively movable so that the film ends can be separated to allow pre-treatment (e. g. surface shaving and/or application of adhesive) of the joining edges, and subsequently brought into overlapping alignment for the purpose of applying pressure to the contacting film edges to seal the joint. Preferably one clamping member is movable in a direction transverse of the length of the film clamped in it, for the purpose of moving the film lengths out of and into overlapping alignment, and such movement of the clamping means may be along an arcuate path. Preferably the transversely movable clamping means carries that length of film which will be underneath when two film lengths overlap, and in this case the clamping means for the other film length are preferably adapted for movement in a direction at right angles to the film carried thereby, for the purpose of moving the two film edges, when overlapping, into contact, and holding them together under pressure in order to seal the joint. Resilient means may be provided to press the film ends together, in order to ensure uniform pressure during the splicing operation. It is preferred that the movement of the transversely movable clamping means referred to above shall be the occasion for treatment of the film edges in preparation for splicing. For this purpose knives or like means for shaving the film surface may be fixed in such a position that the transversely moved film runs against them and becomes shaved to suitable depth. These knives are preferably adjustable to allow alteration of the depth of shaving and to permit resetting to accommodate wear and thus may be provided with screw-adjusting means and a micrometer scale to allow rapid accurate setting to any desired position. Preferably two or more knives are provided, set to different depths of cut, and all traversed by the moved film, so that films of different thicknesses can be shaved to a prearranged thickness for splicing without adjustment of the knives. The transversely movable clamping means may be provided with a knife or like means to shave the edge surface of the stationary length of film, by moving against that surface, during the aforesaid transverse movement. Means are also provided, e. g. carried by the transversely movable clamping member, for applying adhesive to at least one (e. g. the stationary) film surfaces being spliced together. It will thus be seen that, after the film lengths have been clamped in position, the simple transverse movement of one, and subsequent contact-making movement of the other, ensures that as necessary the splicing surfaces become shaved, coated with adhesive, pressed together and spliced in a simple, effective and precise manner.

The invention will be clearly understood from the following description of one form (given, however, merely by way of example) which it may assume, and this description will be more readily followed by reference to the accompanying drawings, wherein:

Figure 1 represents in front sectional elevation a film-splicing machine according to the invention;

Figures 2 and 3 represent respectively in side elevation (with the casing broken away), and in plan the machine shown in Figure 1; and Figures 4 and 5 represent details of the invention.

In carrying the invention into effect in one convenient manner and referring to the accompanying drawings, the film splicing apparatus comprises a flat base 1, with an upstanding semi-cylindrical block 2 and, adjacent thereto, an upstanding channelled or rectangular box-like vertical guide member 3. A rocker 4 has a concave semi-cylindrical undersurface, adapted to conform with the semi-cylindrical surface of the block 2, thus allowing the rocker to ride on the block. The rocker 4 has downwardly extending lugs 5. A bearing block 6 is secured on the base, and a shaft 7 extends between a bore in the bearing block 6 and a similar bore in the side wall of the guide member 3. The shaft 7 passes through bores in the lugs 5 and the block 2, and the shaft axis is aligned with the axis of the semi-cylindrical block 2, so that rocker 4 can be moved easily on the block 2 about the shaft axis.

The upper surface of the rocker 4 is provided with rear lugs 8 supporting a shaft 9 on which is pivoted by lugs 10 a film clamping plate 11. The upper surface of the rocker also has forward lugs 12 supporting a spindle 13 carrying a catch device 14 adapted to engage the front edge of clamping plate 11, to hold the plate down (Figures 2 and 3). A block 15 with a curved undersurface, conforming to the curvature of the rocker 4, is carried beneath the clamping plate 11, and a coiled compression spring 16 between the plate 11 and block 15 ensures pressure of block 15 on the rocker 4 when the plate 11 is closed. The end of one of two lengths of film being spliced together is clamped to the rocker 4 by this clamping plate 11 (with its free end projecting slightly beyond the edge of the clamping plate 11), so that it lies in a substantially horizontal plane with its longitudinal centre line parallel to the axis of the semi-cylindrical block 2. As above explained the clamp comprising plate 11, block 15 and rocker 4 is rockably mounted on block 2 and shaft 7.

The above mentioned vertical guide member 3 is located adjacent to the inner face of the semi-cylindrical block 2 and carries a vertically movable slide 17 provided on its upper surface with film clamping means, namely clamping plate 18, spring block 19, and catch 20, similar to those described above on the arcuately-movable rocker 4. As shown the ends of the shaft 9 are fitted with adjusting and locking screws, and with compression springs bearing against the clamping plates. By these means the clamps, can be adjusted in position towards and away from one another (in order to set film-cutting edges, as will appear below, and the relation of the clamp 11 to scraper knives, also described more fully below).

A follower 21 seated, within the vertical guide 3, in a recess of the movable slide 17, is movable by an eccentric shaft 22 extending between the walls of the guide 3 and having a hand-knobbed lever 23 secured to its outer end, while compression springs 24 are located between the follower 21 and the bottom of the recess in block 17, and other coiled compression springs 25 are located in the guide beneath the slide 17 to urge the block to its uppermost position. Rotation of the shaft 22 by the external hand lever depresses the slide.

The rocker 4 and the slide 17 are provided with relatively overlapping parts between which the end edges of two portions of the film can be pressed together. As best seen in Figure 1 the rocker 4 has a slightly projecting step 26, being an extension of the curved surface on to which a film is clamped by block 15. The edge of the clamping block 19 of the movable slide 17 abuts against the side face of rocker 4 and thus overlaps the step 26, while the movable slide 17 carries a cutter 27 movable against the side of the step 26, referred to hereinafter. The undersurface of block 15 is concave to conform with the curvature of the step 26 which it overlaps.

A length of film is secured in the movable block clamping means 18, 19, 20 with its end projecting above the surface of rocker 4, and it will be seen that when the slide 17 is depressed, as above described, the projecting end of this film is sheared off squarely between the abutting edges of the rocker 4 and block 15, while at the same time, the projecting end of the other film clamped in the rocker 4 is sheared off squarely between the cutter 27 and the step 26. Continued depression of the slide 17 brings the film edges in engaging contact with one another, being pressed together between the undersurface of block 15, and the upper surface of step 26.

An arcuate framework 28 adjacent to the arcuately movable rocker 4 carries two stationary scraper knives 29, 30, in line with one another, and both in the path of the projecting upper surface of the projecting end of the film carried by the rocker 4 during its arcuate movement. These knives are positioned so that the film moves against them and has the upper surface of its edge shaved or scored to a suitable depth. The knives are adjustable by screw-mountings 31 to allow alteration of the depth of scoring or shaving affected, and each may be provided with a suitably calibrated micrometer scale (not shown) to facilitate scraping. The two knives may be set to different cutting depths so that films of different thicknesses may be accommodated in the apparatus and suitably cut by one or other knife without prior adjustment of the knife setting.

On the forward portion of the curved surface of the rocker 4 is a container 32 for a liquid adhesive, having means adapted, when the slide is moved, to contact the edge undersurface of the film clamped to the block 17 and coat it with adhesive. These means may comprise a roller wheel 33 projecting from the side of the container 32 and partially immersed in a bath forming one side of the container 32. The roller 33 is located slightly beyond the sideface of the slide 4, to be in the plane of the end of the film projecting from beneath clamping block 15. For efficient application of adhesive the wheel 33 is rotated during operation of the splicing machine. For this purpose (as seen in Figures 4 and 5) the shaft 34 of wheel 33 projects through a suitable packing in to a chamber 35, where it engages through bevel gearing a shaft 36 extending radially of the arcuate rocker 4. The lower end of shaft 36 engages, through bevel teeth, with a toothed wheel 37, running on a shaft carried by the block 4, and in engagement with an arcuate rack 38. It will be seen that when the rocker 4 is rocked, the wheel 37 runs across rack 38, thus rotating shafts 36, 34 and thereby the wheel 33. The adhesive chamber 32 is provided with a removable screw lid for refilling with adhesive.

The arcuately movable rocker 4 is provided with a knobbed hand lever 40 by which it can be moved (against spring pressure if desired) from one extreme position in which the films are in overlapping alignment, to its other extreme position, in which the film carried thereby has moved completely past the stationary knives, and back again.

In use the apparatus described above is operated as follows:

The ends of the two film lengths being joined together are secured in the two clamping means. The slide 17 is first depressed and then raised, cutting the ends of the films as described above. The arcuately movable rocker is then moved rearwardly and thereafter returned to its forward position by hand operation. By these operations, as described above, the ends of both films are first cut square; the upper surface of the lower film is then shaved or scored, and adhesive is simultaneously applied to the end undersurface of the upper film. Thereafter the vertically movable slide is forced down again by hand operation of the cam lever to bring and press together the treated surfaces of the two films. In a short time the joining of the films is complete, and the clamps can be released to remove the spliced lengths.

The clamping means may be provided with pins and cooperating apertures (not shown) to engage the sprocket holes of the films and locate them accurately in desired transverse positions on their clamping supports.

The base may be provided with four rubber feet, and one of these, e. g. 42, may be adjustable by screw means 43, with a clamping nut 44, to allow the machine to be set up firmly on an irregular surface. The machine may be provided with a cover 45, having a handle 46, and engageable with hooks 47 on the base 1, by catch clips 48 of any convenient form.

It should be understood that the invention is not limited to the details of the form described above which may be modified, in order to meet various conditions and requirements encountered, without departing in any way from the scope of the invention.

What I claim is:

1. A film splicing machine for securing together two film ends comprising a base, a clamping device for receiving one film end, rockably mounted on said base, another clamping device for receiving the other film end, mounted in a guide on said base, and linearly slidable therein in a direction substantially perpendicular to the rocking axis of said first-mentioned clamping device, overlapping portions of said clamping device between which the film ends are held together during a splicing operation, means on said rockable clamping device for applying adhesive to the end of the film held in said slidable clamping device when said rockable clamping device is swung on its rocking axis, and means for relatively moving said clamping devices to bring together their said overlapping portions with the film ends held together therebetween.

2. A film splicing machine for securing together two film ends comprising a base, a clamping device for receiving one film end, rockably mounted on said base, another clamping device for receiving the other film end mounted in a guide on said base, and linearly slidable therein in a direction substantially perpendicular to the rocking axis of said first-mentioned clamping device, overlapping portions of said clamping device between which the film ends are held together during a splicing operation, stationary scraper means mounted on said base in the path of the film end carried by said rockable clamping device when the latter is rocked, means on said rockable clamping device for applying adhesive to the end of the film held in said slidable clamping device when said rockable clamping device is rocked, and means for relatively moving said clamping devices to bring together their said overlapping portions with the film ends held together therebetween.

3. A film splicing machine according to claim 2 wherein said scraper means comprise a knife associated with screw thread means for adjusting its position whereby to adjust the depth of scraping of the film.

4. A film splicing machine according to claim 2 wherein said scraper means comprise a plurality of knives independently associated with screw thread position adjusting means adapted to set the separate knives at different levels in relation to the surface of film being shaved.

5. A film splicing machine for securing together two film ends comprising a base, a clamping device for receiving one film end, rockably mounted on said base, another clamping device for receiving the other film end, mounted in a guide on said base, and linearly slidable therein in a direction substantially perpendicular to the rocking axis of said first-mentioned clamping device, a cutting edge on said rockable clamping device, a cooperating cutting edge on said slidable clamping device, means for moving said slidable clamping device to bring together said cutting edges and thereby cutting square the end of the film in said rockable clamping device, means on said rockable clamping device for applying adhesive to the end of the film held in said slidable clamping device when said rockable clamping device is swung on its rocking axis, overlapping portions of said clamping devices between which the film ends are held together during a splicing operation, and means for relatively moving said clamping devices to bring together their said overlapping portions with the film ends held together therebetween.

6. A film splicing machine according to claim 5 comprising means for adjusting the relative positions of said cutting edges.

7. A film splicing machine for securing together two film ends comprising a base incorporating a part-cylindrical bearing surface, a clamping device including a sectored block with an arcuate-surfaced step for receiving one film end, rockably mounted on said part-cylindrical bearing, another clamping device, including a concave arcuate surface overlapping said arcuate-surfaced step, for receiving the other film end, mounted in a guide on said base, and linearly slidable therein in a direction substantially perpendicular to the rocking axis of said first-mentioned clamping device, means on said rockable clamping device for applying adhesive to the end of the film held in said slidable clamping device when said rockable clamping device is swung on its rocking axis, and means for relatively moving said clamping devices to bring together their said overlapping arcuate surfaces with the film ends held together therebetween during a splicing operation.

8. A film splicing machine for securing together two film ends comprising a base, a clamping device for receiving one film end, rockably mounted on said base, another clamping device for receiving the other film end, mounted in a guide on said base, and linearly slidable therein in a direction substantially perpendicular to the rocking axis of said first-mentioned clamping device, overlapping portions of said clamping devices between which the film ends are held together during a splicing operation, a reservoir of adhesive on said rockable clamping device, means on said rockable clamping device for applying adhesive to the end of the film held in said slidable clamping device when said rockable clamping device is swung on its rocking axis, means operated automatically upon the rocking of said rockable clamping means for maintaining service of adhesive from said reservoir to said adhesive-applying means, and means for relatively moving said clamping devices to bring together their said overlapping portions with the film ends held together therebetween.

9. A film splicing machine for securing together two film ends comprising a base, a clamping device for receiving one film end, rockably mounted on said base, another clamping device for receiving the other film end, mounted in a guide on said base, and linearly slidable therein in a direction substantially perpendicular to the rocking axis of said first-mentioned clamping device, overlapping portions of said clamping devices between which the film ends are held together during a splicing operation, a reservoir of adhesive on said rockable clamping device, means on said rockable clamping device, including a rotatable roller wheel partially immersed in the adhesive in said reservoir, for applying adhesive to the end of the film held in said slidable clamping device when said rockable clamping device is swung on its rocking axis, and means for relatively moving said clamping devices to bring together their said overlapping portions with the film ends held together therebetween.

10. A film splicing machine for securing together two film ends comprising a base, a clamping device for receiving one film end, rockably mounted on said base, another clamping device for receiving the other film end, mounted in a guide on said base, and linearly slidable therein in a direction substantially perpendicular to the rocking axis of said first-mentioned clamping device, overlapping portions of said clamping devices between which the film ends are held together during a splicing operation, a reservoir of adhesive on said rockable clamping device, means on said rockable clamping device including a rotatable shaft, a roller wheel on said shaft partially immersed in the adhesive in said reservoir, a fixed rack on said base and gearing connecting said rotatable shaft to said rack whereby rocking movement of said rockable clamping device effects rotation of said shaft and wheel, for applying adhesive to the end of the film held in said slidable clamping device when said rockable clamping device is swung on its rocking axis, and means for relatively moving said clamping devices to bring together their said overlapping portions with the film ends held together therebetween.

11. A film splicing machine for securing together two film ends comprising a base, a clamping device for receiving one film end, rockably mounted on said base, another clamping device for receiving the other film end, mounted in a guide on said base, and linearly slidable therein in a direction substantially perpendicular to the rocking axis of said first-mentioned clamping device, overlapping portions of said clamping devices between which the film ends are held together during a splicing operation, means mounted on, secured to and rockable with said rockable clamping device for applying adhesive to the end of the film held in said slidable clamping device when said rockable clamping device is swung on its rocking axis, and means for relatively moving said clamping devices to bring together their said overlapping portions with the film ends held together therebetween.

References Cited in the file of this patent

UNITED STATES PATENTS

| Number | Name | Date |
|---|---|---|
| 1,489,261 | Malizia | Apr. 8, 1924 |
| 1,596,966 | Griswold | Aug. 24, 1926 |
| 2,460,619 | Briskin | Feb. 1, 1949 |
| 2,518,927 | Ordman et al. | Aug. 15, 1950 |
| 2,561,856 | Goldberg | July 24, 1951 |
| 2,621,706 | Jirouch | Dec. 16, 1952 |